United States Patent
Horneck

(10) Patent No.: US 8,210,597 B2
(45) Date of Patent: Jul. 3, 2012

(54) SEAL FOR A HOLE

(75) Inventor: Michael Horneck, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 12/427,488

(22) Filed: Apr. 21, 2009

(65) Prior Publication Data

US 2009/0261617 A1 Oct. 22, 2009

(30) Foreign Application Priority Data

Apr. 22, 2008 (DE) .................. 10 2008 020 085

(51) Int. Cl.
*B62D 25/24* (2006.01)
*B60J 5/04* (2006.01)

(52) U.S. Cl. ................. 296/146.9; 220/789; 296/154

(58) Field of Classification Search ............. 174/50.5, 174/564; 220/315, 789, 794; 277/630, 637, 277/640, 925; 296/146.9, 154, 213
See application file for complete search history.

(56) References Cited

U.S. PATENT DOCUMENTS

| | | | | |
|---|---|---|---|---|
| 2,537,786 A * | 1/1951 | Poupitch | ........................ | 411/508 |
| 2,821,429 A * | 1/1958 | Rantala | ........................ | 296/208 |
| 3,382,889 A * | 5/1968 | Heinz et al. | ................... | 137/855 |
| 3,701,560 A * | 10/1972 | Emmerson | ...................... | 96/154 |
| 3,935,686 A * | 2/1976 | Dozois | ........................ | 52/302.7 |
| 4,333,660 A * | 6/1982 | Cupit | ........................ | 277/630 |
| 4,938,378 A * | 7/1990 | Kraus | ........................ | 220/789 |
| 5,071,094 A | 12/1991 | Wolkersdorfer et al. | | |
| 5,114,036 A * | 5/1992 | Liu | ........................ | 220/787 |
| 5,317,462 A * | 5/1994 | Kakizaki et al. | ........... | 360/97.02 |
| 5,702,133 A * | 12/1997 | Pavur et al. | ...................... | 292/80 |
| 5,873,623 A * | 2/1999 | Dunton et al. | ................. | 296/154 |
| 5,902,004 A * | 5/1999 | Waltz et al. | ................. | 296/146.9 |
| 6,464,101 B1 * | 10/2002 | Siragusa et al. | .............. | 220/795 |
| 6,708,979 B2 * | 3/2004 | Stratman et al. | .............. | 277/316 |
| 7,370,906 B2 * | 5/2008 | Isobe et al. | ................. | 296/146.7 |
| 2007/0108216 A1 | 5/2007 | Kurth et al. | | |
| 2010/0176560 A1 * | 7/2010 | Burgess | ........................ | 277/637 |

FOREIGN PATENT DOCUMENTS

| | | | |
|---|---|---|---|
| DE | 4005978 A1 | | 8/1991 |
| DE | 4322433 C1 | | 8/1994 |
| JP | 58214477 A | * | 12/1983 |
| JP | 60045479 A | * | 3/1985 |
| JP | 60045482 A | * | 3/1985 |
| JP | 62083252 A | * | 4/1987 |
| JP | 03284415 A | * | 12/1991 |
| JP | 10297532 A | | 11/1998 |

OTHER PUBLICATIONS

German Patent Office, German Search Report for German Application No. 102008020085.9, Oct. 5, 2010.

* cited by examiner

*Primary Examiner* — Glenn Dayoan
*Assistant Examiner* — Paul Chenevert
(74) *Attorney, Agent, or Firm* — Ingrassia Fisher & Lorenz, P.C.

(57) ABSTRACT

A seal is provided for a hole in a sheet. The clamped hole surface has an articulated line, which divides the hole surface into a first partial surface and a second partial surface inclined relative thereto, exhibiting the following features: a sealing surface for the hole, the geometry of which corresponds to the hole geometry; an elastic element secured to the sealing surface; and the elastic element is incorporated into the hole abuts on one side (e.g., interior) of the sheet, pressing the sealing surface against a second side (e.g., exterior) of the sheet.

11 Claims, 4 Drawing Sheets

SEAL FOR A HOLE

CROSS-REFERENCE TO RELATED APPLICATION

This application claims priority to German Patent Application No. 102008020085.9, filed Apr. 22, 2008.

TECHNICAL FIELD

The invention relates to a seal for a hole, in particular for a water discharge hole in a motor vehicle.

BACKGROUND

The interior of a motor vehicle door is a wet area, so that it is necessary to allow any water that penetrated inside to run off via so-called water discharge holes. Such holes are typically provided with a seal to prevent dust from penetrating. It can here happen that the hole would have to have an articulated line in the lower door area given its location and the door structure, as a rule a horizontal articulated line. In practical instances, such an articulated line is avoided by suitably embossing the door framework.

In view of the foregoing, at least one object of an embodiment of the invention is to provide a seal for a hole, in particular for a water discharge hole of a motor vehicle door, in which the hole has a hole surface with at least one articulated line, so that the hole surface is divided into a first partial surface and a second partial surface inclined relative thereto. In addition, other objects, desirable features, and characteristics will become apparent from the subsequent summary and detailed description, and the appended claims, taken in conjunction with the accompanying drawings and this background.

SUMMARY

One first embodiment of the invention relates to a hole in a sheet, and the clamped hole surface has at least one articulated line. The articulated line divides the hole surface into a first partial surface and a second partial surface inclined relative thereto. The seal has a sealing surface or flat sealing element for the hole, the geometry of which corresponds to the hole geometry, as well as an elastic element secured to the sealing surface. Once the elastic element is incorporated into the hole, it abuts a first side (i.e., the inside of the sheet), thereby pressing the sealing surface against the second side (i.e., the outside of the sheet).

In practical usage, the elastic element of the seal is introduced through the first partial surface and into the hole, and the sealing element is then shifted parallel to the second partial surface until the sealing surface overlapping the hole surface covers the hole. The structure of the seal is here very simple, and yields a reliable seal for the hole, without the articulated area having to be flattened via embossing or smoothing compound (e.g., a type of knifing filler), so as to achieve a flat hole surface. As a result, there is no need for the embossing process or smoothing compound.

If the hole is a water discharge hole, the seal makes it possible to drain water from the inside (this is the wet area between the outer and inner door skin), and simultaneously prevent dust from getting in from the outside (the outside of the door). This ensures a good corrosion protection for the door.

In a second embodiment, the sealing surface is pre-stressed relative to the first partial surface. This is recommended for oblong, perpendicular holes for which the first partial surface is situated above. In this case, the pre-stress prevents water streaming from the top down to the hole from outside. The sealing surface here is not pre-stressed relative to the second partial surface of the hole, so that water can flow oppositely toward the outside. This solution is ideal for water discharge holes in motor vehicles, in particular in motor vehicle doors.

In a third embodiment, the elastic element only abuts the portion of the inside of the sheet that borders the second partial surface, the lower partial surface in the example presented in the last paragraph. This makes it easier to incorporate the elastic element.

In another embodiment, the elastic element encompasses two crossing webs that project from the sealing surface. The webs can extend perpendicularly from the sealing surface, and enable self-abutment in two different directions, for example in a longitudinal and transverse direction in the case of an oblong sealing element.

It can further be provided that an oblong sealing surface is provided with a first web projecting from it and running in a longitudinal direction, and the web has a central notch. When the elastic element is incorporated, it is deformed in a longitudinal direction, specifically the central notch is compressed. This makes it possible for the outermost end of the elastic element relative to the longitudinal direction to snap into the hole, and in addition to be incorporated into the hole.

In addition, an embodiment can be selected in which two transversely running second webs are provided, which abut the segment of the sheet interior that borders the second partial surface. This embodiment is again used for an oblong hole or oblong sealing surface, and the second webs provide the abutment relative to the first sheet.

In a concretization of the aforementioned embodiments with webs projecting from the sealing surface, the second webs and the sealing surface are designed as a single unit. This unit can be easily manufactured as a plastic part, for example as a rubbery sealing element via injection molding.

A second embodiment of the invention relates to a side door for a motor vehicle, which exhibits a hole, the clamped hole surface of which has an articulated line, and with a seal incorporated into the hole according to one of the preceding embodiments. As described above, the hole can be a water discharge hole situated in the lower side door area, for example an upright oriented, oblong water discharge hole, the first partial surface of which is located above. The pre-stress of the sealing surface then prevents water from entering the first partial surface, and exiting the second partial surface.

A third embodiment of the invention relates to a motor vehicle with a hole described above, for example one which can be arranged in its side door.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
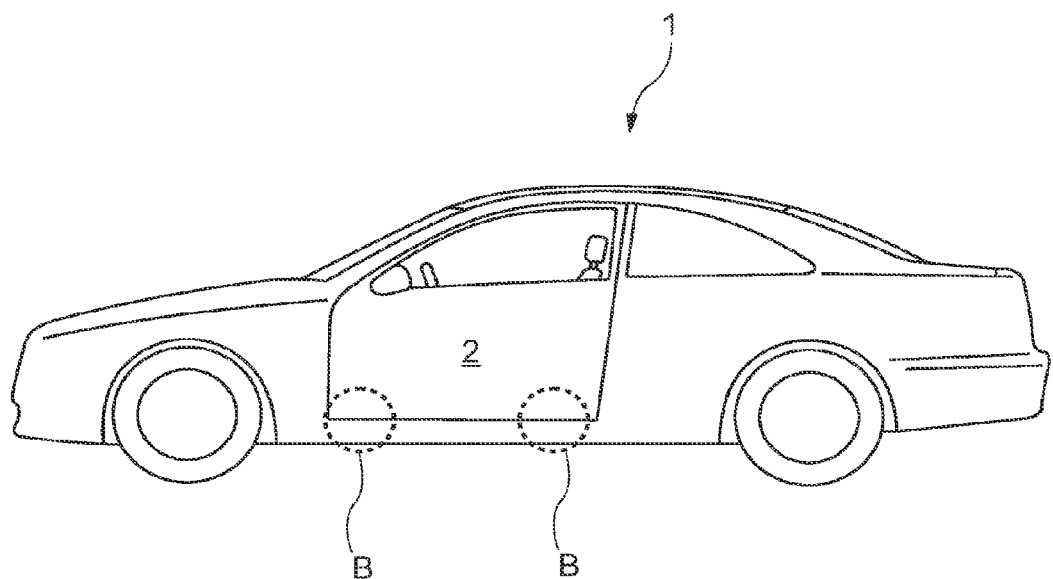
FIG. 1 is a side view of a motor vehicle.

The figures generally use identical reference numbers to denote the same objects, and FIG. 1 shows a side view of a motor vehicle 1. It has a side door 2, which has a (water discharge) hole (not shown) inside at areas B.

Figure 2:
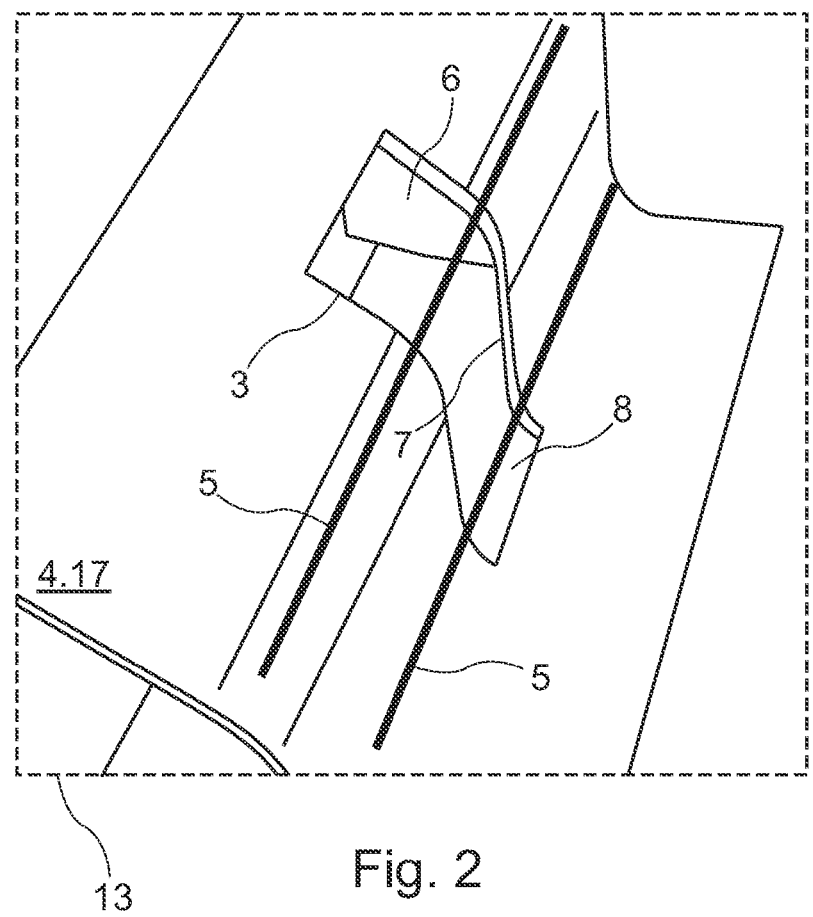
FIG. 2 is a water discharge hole of the motor vehicle in FIG. 1.

FIG. 2 shows a perspective detailed view of the hole 3 in the (interior) sheet 4 of the side door 2. Due to the mutually parallel articulated lines 5, the hole 3 lacks a flat surface. The hole surface is rather divided into three, specifically into a first partial surface 6, a second partial surface 7 and a third partial surface 8. The three partial surfaces 6, 7 and 8 are inclined relative to each other.

Figure 3:
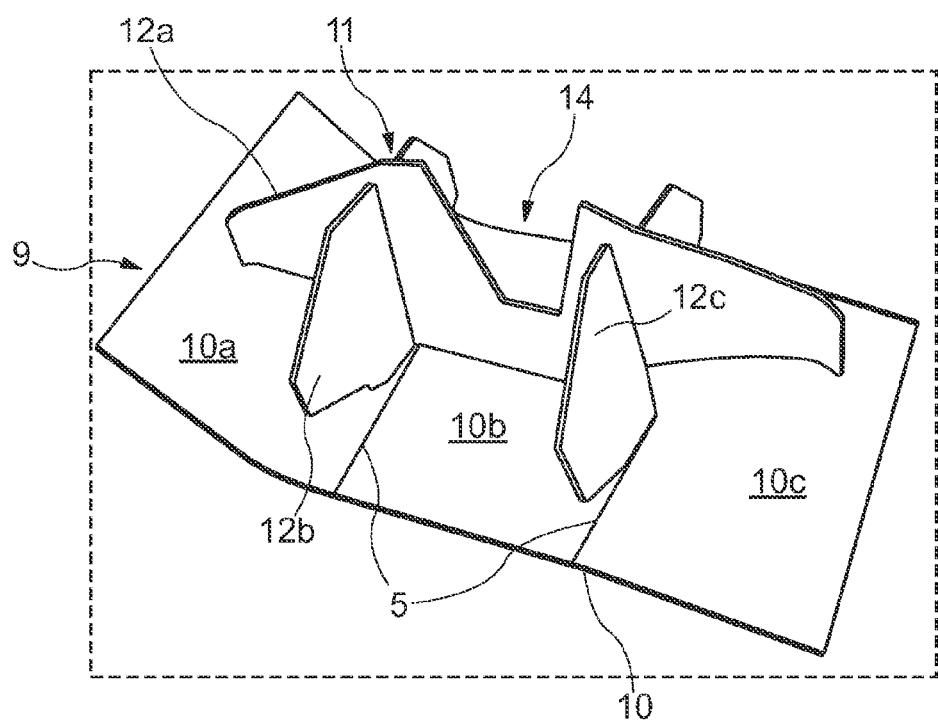
FIG. 3 is a seal for the water discharge hole.

FIG. 3 shows an oblong seal 9 for the hole 3 in FIG. 2. The rectangular seal 9 has a sealing surface 10 for overlapping and covering the hole 3, which is also divided into three due to the two articulated lines 5 of the hole 3. Part 10a covers the first partial surface 6, partial 10b the second partial surface 7, and part 10c the third partial surface 8. Since part 10a is pre-stressed relative to the allocated partial surface 6 or the sheet 4, the two parts 10a and 10b are inclined relative to each other.

An elastic element 11 is secured to the sealing surface 10. It consists of a web 12a running in a longitudinal direction, as well as two webs 12b and 12c perpendicular thereto. The three webs 12a, 12b and 12c along with the sealing surface 10 are designed as a single unit and made out of plastic.

Figure 4:
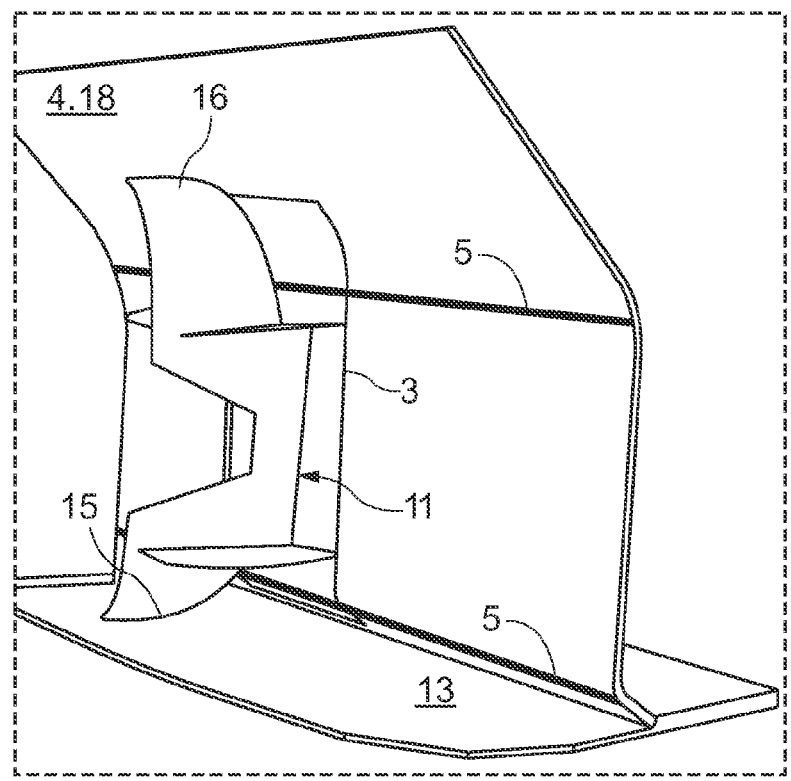
FIG. 4 is a seal incorporated into the water discharge hole.

During assembly, the elastic element 11 is first aligned with the parts 10b, 10c of its sealing surface 10 parallel to the second partial surface 7, and then introduced from above through the first partial surface 6 in a longitudinal direction. Due to the pre-stress, part 10a of the sealing surface 10 ends up covering the first partial surface 6 in a flush manner, and simultaneously presses lower end 15 of the web 12a against the lower sheet 13, compare FIG. 4. The vertical position of the seal 9 is fixed as a result. To allow the upper end 16 of the vertical webs 12a to get under the sheet 4 at the same time, the vertical web 12a has a central incision 14. The latter can be compressed during assembly, so that the upper end of the web 12a snaps under the sheet 4. As a result, the elastic element 11 introduced into the hole 3 abuts the lateral ends of the webs 12b, 12c at the interior 18 of the sheet 4 shown on FIG. 4, and simultaneously presses the sealing surface 10 on the exterior 17 of the sheet 4, which finally yields an axis for the hole 3, the geometry of which corresponds to the hole geometry.

If water streams downwardly during practical usage of the motor vehicle 1 on the inner sheet 4 of the side door 2, the pre-stress of the upper part (part 10a) of the sealing surface 10 ensures that no water gets into the inside of the side door 2. On the other hand, if water accumulates inside the side door 2, it can exit in the lower area of the seal 9, specifically at about the height of the lower end 15 of the web 12a. At the same time, dirt is prevented from getting inside the side door 2 from outside.

Even though specific embodiments were described above, the expert will recognize that the description of these embodiments is not intended to limit the invention in the specified form. Rather, the invention is to encompass all modifications, equivalents and alternatives that fall within the protective scope of the claimed invention. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seal for a hole in a sheet, wherein a clamped hole surface has an articulated line that divides the clamped hole surface into a first partial surface and a second partial surface inclined relative to the first partial surface, the seal comprising:
    a sealing surface for the hole having a geometry of which corresponds to a hole geometry of the hole; and
    an elastic element secured to the sealing surface and projecting therefrom, the elastic element including a central notch, and a first web extending in a first direction, wherein the elastic element when incorporated into the hole is configured to abut on a first side of the sheet, pressing the sealing surface against a second side of the sheet.

2. The seal according to claim 1, wherein the sealing surface is pre-stressed relative to the first partial surface.

3. The seal according to claim 1, wherein the elastic element is configured to encompass at least two crossing webs that project from the sealing surface.

4. The seal according to claim 1, wherein the clamped hole surface of the hole has at least two articulated lines.

5. The seal according to claim 1, wherein the sealing surface is an oblong sealing surface, the first web projects from the oblong sealing surface, and the first direction is along a longitudinal direction of the oblong sealing surface.

6. The seal according to claim 5, further comprising at least two transversely running second webs that abut a segment of the first side of the sheet that borders the second partial surface.

7. The seal according to claim 6, wherein the first web and the at least two transversely running second webs are designed as a single unit with the sealing surface.

8. A side door for a motor vehicle, exhibiting a hole with a clamped hole surface that has an articulated line, and with a seal incorporated into the hole, the seal comprising:
    a sealing surface for the hole having a geometry of which corresponds to a hole geometry of the hole; and
    an elastic element secured to the sealing surface and projecting therefrom, wherein the elastic element when incorporated into the hole is configured to abut on a first side of a sheet, thereby pressing the sealing surface against a second side of the sheet, wherein the elastic element includes a first web that extends in a first direction and a central notch.

9. The side door according to claim 8, wherein the hole is a water discharge hole situated in a lower side door area.

10. The side door according to claim 8, wherein the hole is an upright oriented, oblong water discharge hole.

11. A motor vehicle exhibiting a hole with a clamped hole surface having an articulated line and a seal incorporated into the hole, the seal comprising:
    a sealing surface for the hole having a geometry of which corresponds to a hole geometry of the hole; and
    an elastic element secured to the sealing surface and projecting therefrom, wherein the elastic element when incorporated into the hole is configured to abut on a first side of a sheet thereby pressing the sealing surface against a second side of the sheet, wherein the elastic element includes a central notch and a first web extending in a first direction.

* * * * *